US009241852B2

(12) United States Patent
Dougherty et al.

(10) Patent No.: US 9,241,852 B2
(45) Date of Patent: Jan. 26, 2016

(54) ALL TERRAIN ADAPTER FOR FOLDING WHEELCHAIR

(71) Applicants: Patrick S. Dougherty, Boise, ID (US); Michael E. Dougherty, Boise, ID (US)

(72) Inventors: Patrick S. Dougherty, Boise, ID (US); Michael E. Dougherty, Boise, ID (US)

( * ) Notice: Subject to any disclaimer, the term of this patent is extended or adjusted under 35 U.S.C. 154(b) by 0 days.

(21) Appl. No.: 14/086,846

(22) Filed: Nov. 21, 2013

(65) Prior Publication Data

US 2015/0137480 A1 May 21, 2015

(51) Int. Cl.
*B60B 11/10* (2006.01)
*A61G 5/08* (2006.01)
*A61G 5/06* (2006.01)

(52) U.S. Cl.
CPC ... *A61G 5/08* (2013.01); *A61G 5/06* (2013.01)

(58) Field of Classification Search
CPC ............ A61G 5/047; A61G 5/04; A61G 5/10
USPC .................................... 280/250.1, 304.1, 767
See application file for complete search history.

(56) References Cited

U.S. PATENT DOCUMENTS

| | | | | |
|---|---|---|---|---|
| 444,639 A | | 1/1891 | O'Neil | |
| 974,365 A | | 11/1910 | Draper | |
| 1,610,921 A | | 12/1926 | Borowski et al. | |
| 1,876,963 A | | 9/1932 | Klass | |
| 2,596,411 A | | 5/1952 | Jordan | |
| 2,649,309 A | | 8/1953 | Deissner | |
| 2,859,975 A | | 11/1958 | Weaver et al. | |
| 3,069,182 A | | 12/1962 | Hufford | |
| 3,485,508 A | | 12/1969 | Hudnall | |
| 3,485,510 A | | 12/1969 | Merlan | |
| 3,694,004 A | | 9/1972 | Seibers | |
| 4,132,423 A | | 1/1979 | Chant | |
| 4,141,566 A | | 2/1979 | Benes | |
| 4,190,261 A | | 2/1980 | Moutz | |
| 4,239,248 A | | 12/1980 | Ewers | |
| 4,316,616 A | * | 2/1982 | Boivin | 280/304.1 |
| 4,323,258 A | | 4/1982 | Culpeper | |
| 4,336,952 A | | 6/1982 | Rochman | |
| 4,359,231 A | | 11/1982 | Mulcahy | |
| 4,471,972 A | * | 9/1984 | Young | 280/304.1 |
| 4,483,548 A | * | 11/1984 | Zirrilo | 280/304.1 |
| 4,690,420 A | | 9/1987 | Belka | |
| 4,720,117 A | | 1/1988 | Hay | |
| 4,789,175 A | | 12/1988 | Schramm | |
| 4,811,964 A | * | 3/1989 | Horn | 280/250.1 |
| 5,076,390 A | | 12/1991 | Haskins | |
| 5,116,067 A | | 5/1992 | Johnson | |

(Continued)

FOREIGN PATENT DOCUMENTS

| | | |
|---|---|---|
| DE | 19724024 A | 10/1998 |
| EP | 184492 A | 6/1986 |

(Continued)

OTHER PUBLICATIONS

EP 184492 A1 Translation from EPO Website.

(Continued)

*Primary Examiner* — Hau Phan
(74) *Attorney, Agent, or Firm* — Dergosits & Noah LLP

(57) ABSTRACT

An adapter for coupling an all terrain attachment to a folding wheelchair. A crossbar includes a clamp at each end thereof for coupling between the side frames of the folding wheelchair. An extension bar is coupled at one end to the crossbar and at the other end to the all terrain attachment.

20 Claims, 6 Drawing Sheets

(56) References Cited

U.S. PATENT DOCUMENTS

| | | | | |
|---|---|---|---|---|
| 5,149,118 | A | 9/1992 | Oxford | |
| 5,241,876 | A * | 9/1993 | Mathis | 280/250.1 |
| 5,273,304 | A | 12/1993 | Berkheimer | |
| 5,280,937 | A | 1/1994 | Needham | |
| 5,312,127 | A | 5/1994 | Oxford | |
| 5,427,398 | A | 6/1995 | Weybrecht | |
| 5,494,126 | A | 2/1996 | Meker | |
| 5,497,926 | A * | 3/1996 | Rittenhouse | 280/304.1 |
| 5,501,480 | A | 3/1996 | Ordelman et al. | |
| 5,624,128 | A | 4/1997 | Owens | |
| 5,695,204 | A | 12/1997 | Ford | |
| 5,860,657 | A | 1/1999 | Kroher | |
| 5,931,244 | A | 8/1999 | Renfroe et al. | |
| 5,983,452 | A | 11/1999 | McGovern | |
| 6,027,132 | A | 2/2000 | Robinson et al. | |
| 6,203,053 | B1 | 3/2001 | Sohrt et al. | |
| 6,485,039 | B1 | 11/2002 | Ming-Fu | |
| 6,517,092 | B2 | 2/2003 | Humphrey | |
| 6,572,130 | B2 | 6/2003 | Greene et al. | |
| 6,626,446 | B1 | 9/2003 | Yosef | |
| 6,669,222 | B1 | 12/2003 | Barrett et al. | |
| 6,869,084 | B2 | 3/2005 | Volk et al. | |
| 7,073,822 | B1 | 7/2006 | Renfroe et al. | |
| 7,229,090 | B2 | 6/2007 | Cumbie | |
| 7,377,527 | B2 | 5/2008 | Cunningham | |
| 7,503,195 | B2 | 3/2009 | Vegvary | |
| 7,549,655 | B2 | 6/2009 | Fan | |
| 7,694,991 | B2 | 4/2010 | Mills et al. | |
| 7,699,325 | B2 | 4/2010 | Durbin | |
| 7,735,847 | B2 | 6/2010 | Dougherty | |
| 7,976,049 | B2 * | 7/2011 | Chiu | 280/304.1 |
| 8,152,192 | B2 * | 4/2012 | Dougherty | 280/304.1 |
| 8,187,156 | B2 | 5/2012 | Hochberg et al. | |
| 2001/0033069 | A1 | 10/2001 | Ivers | |
| 2002/0089136 | A1 | 7/2002 | Gu | |
| 2004/0075230 | A1 | 4/2004 | Lin | |
| 2004/0108147 | A1 | 6/2004 | Ross | |
| 2004/0173989 | A1 | 9/2004 | Brichet et al. | |
| 2005/0230930 | A1 | 10/2005 | Chung | |
| 2006/0000664 | A1 | 1/2006 | Huang et al. | |
| 2006/0261575 | A1 | 11/2006 | Ehrenreich et al. | |
| 2007/0018443 | A1 | 1/2007 | Wilmot | |
| 2007/0096427 | A1 | 5/2007 | Knaub | |
| 2008/0115982 | A1 | 5/2008 | Lin | |
| 2009/0008902 | A1 | 1/2009 | Kylstra et al. | |
| 2010/0201089 | A1 | 8/2010 | Durbin | |
| 2011/0095508 | A1 | 4/2011 | Chiu | |
| 2013/0249212 | A1 | 9/2013 | McKiernan | |

FOREIGN PATENT DOCUMENTS

| | | | |
|---|---|---|---|
| FR | 2841462 | A | 1/2004 |
| FR | 2882253 | A1 | 2/2005 |
| WO | 2010/139507 | A1 | 4/2010 |

OTHER PUBLICATIONS

DE 19724024 A1 Translation from EPO Website.

FR 2841462 A1 Translation from EPO Website.

International Search Report for PCT/US14/64140 mailed Apr. 13, 2015.

Written Opinion for PCT/US14/64140 mailed Apr. 13, 2015.

* cited by examiner

ALL TERRAIN ADAPTER FOR FOLDING WHEELCHAIR

TECHNICAL FIELD

This disclosure relates generally to wheelchairs, and more particularly, to an all terrain adapter for folding wheelchairs.

BACKGROUND

A wheelchair with two large diameter wheels in the back and two small diameter wheels in the front and a short wheelbase in-between the large and small wheels makes for a very good performer when indoors on smooth surfaces. The short wheelbase allows the wheelchair to be maneuvered between obstacles and the smooth surfaces allow the small front wheels to roll easily. The small front wheels also allow the wheelchair user to get closer to obstacles and not be limited by the front wheels sticking out and interfering with obstacles. These traits that make indoor use of a wheelchair good are the same traits that make for difficulties when the wheelchair is used outdoors. The short wheelbase makes the wheelchair unstable when rough ground is attempted and the same small wheels that stay out of the way and roll so nice indoors on smooth floors often get hung up on small bumps and the drag can often upset the wheelchair user and bring them to an abrupt halt and in the worst case throw the user out of their chair.

U.S. Pat. Nos. 7,735,847 and 8,152,192, both of which are incorporated by reference herein, describe an all terrain attachment, marketed as the FreeWheel® wheelchair attachment (see www.gofreewheel.com), that solves these issues for many wheelchairs by effectively lengthening the wheelbase to provide more stability and also taking the small front wheels out of the picture by raising them off the ground and replacing them with a larger diameter wheel further out front. The FreeWheel attachment can be quickly and easily installed onto an existing wheelchair thereby allowing the user to experience better performance in terms of ease of rolling over rough terrain due to less resistance, and also to feel more secure in such environments due to the longer wheelbase.

However, since the existing FreeWheel attachment was designed to couple to the footrest of a rigid-frame wheelchair, it does not work with a folding wheelchair. A rigid-frame wheelchair typically includes a solid footrest construction, and the chair can be disassembled and stored when not in use. A folding wheelchair, however, typically has a pair of folding, detachable two-piece footrests, and thus no place to attach the FreeWheel attachment. Thus, there is a need for a way to support the use of an all terrain attachment on a folding wheelchair.

DETAILED DESCRIPTION

As noted above, the FreeWheel® attachment was initially designed to be coupled to the solid footrest of a rigid-frame wheelchair. In this disclosure, an adapter for a folding wheelchair is described. The adapter provides a rigid lateral member or crossbar that is coupled between the side frames of a folding wheelchair, and a rigid forward extension member coupled to the middle of the lateral member. The FreeWheel attachment may then be coupled to the extension member.

1. Folding Wheelchair

Figure 1:
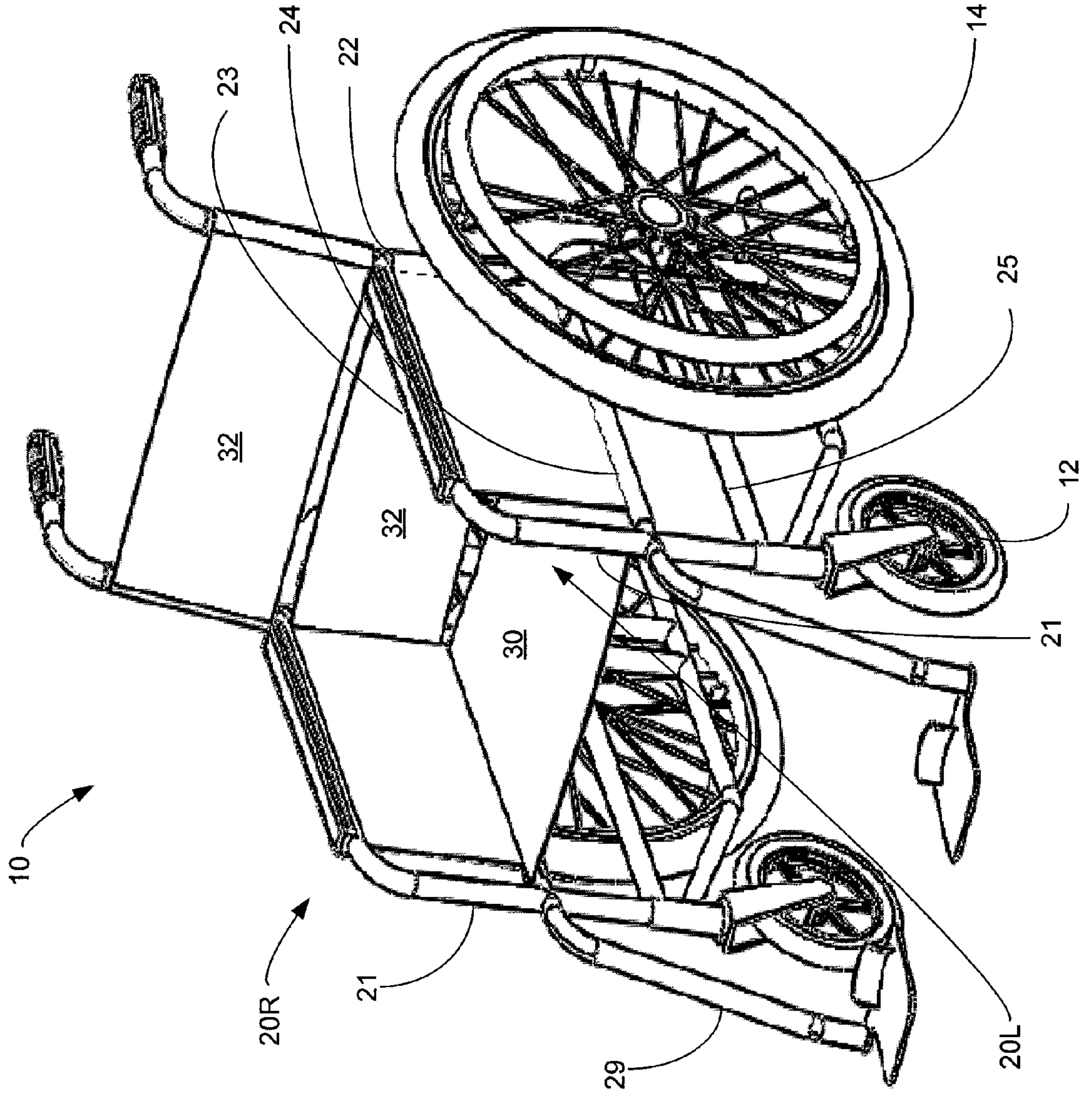
FIG. 1 is a perspective view of a folding wheelchair.

A typical folding wheelchair 10 is illustrated in FIG. 1. The wheelchair 10 is constructed symmetrically, with a left side frame 20L and a right side frame 20R that are designed to fold or flatten inward toward each other to provide a more compact shape for storage or transport. The seat bottom 30 and seat back portions 32 are affixed between the side frames 20, and may be constructed of a soft fabric or other pliable material, or a folding seam (not shown) can be built into the seat and back.

A pair of relatively small diameter front wheels 12 are coupled to the front of the respective side frames 20, and a pair of relatively large diameter rear wheels 14 are coupled to the rear of the respective side frames.

Each side frame 20 has at least a front vertical member 21, a rear vertical member 22, a top horizontal member 23, a middle horizontal member 24, and a bottom horizontal member 25 that define the basic structure of the side frame. The seat bottom 30 is affixed between respective middle horizontal members 24. The seat back portions 31 are affixed between respective rear vertical members 22. Additional structural members may be provided in the side frames of particular designs, for example, to provide additional support for wheel attachment. All structural members are preferably formed of tubular steel, aluminum, or equivalent materials, attached together by well-known methods, or form-molded. Symmetrical foot supports 29 are coupled to the front vertical members 21, usually at or near the middle horizontal member 24, and may be removable or foldable.

2. Adapter for All Terrain Attachment

Figure 2:
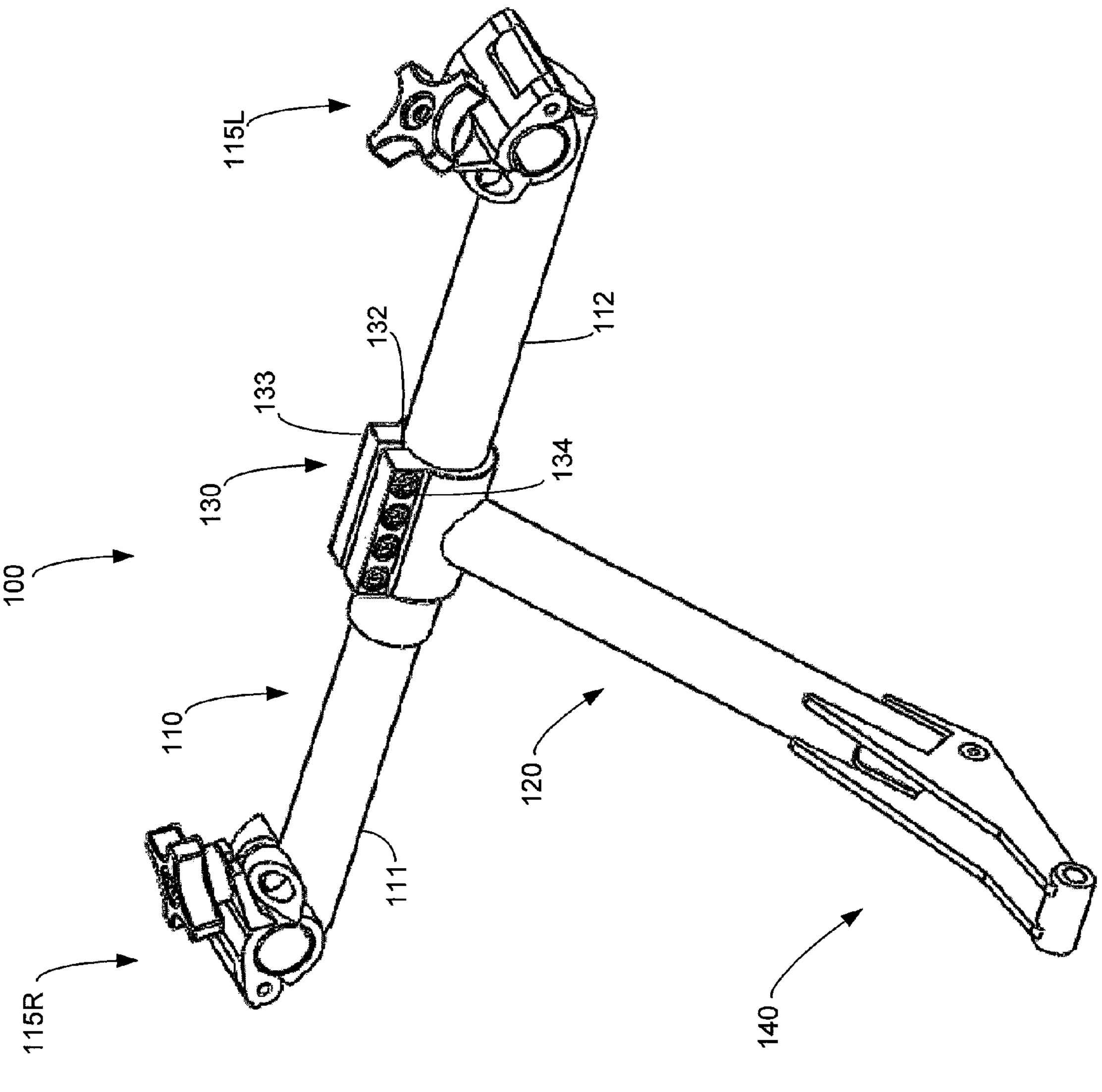
FIG. 2 is a perspective view of an adapter for coupling an all terrain attachment to the folding wheelchair of FIG. 1.

Referring to FIG. 2, an adapter 100 is illustrated that allows an all terrain wheelchair attachment, such as the FreeWheel attachment, to be coupled to a folding wheelchair, such as wheelchair 10. The adapter 100 includes a crossbar 110 and connectors 115 at each end configured for coupling between with respective side frames 20 of the wheelchair. The adapter 100 also includes an extender bar 120 coupled to the middle of the crossbar no by a center clamp 130. The extender bar 120 extends down and forward from the crossbar 120 to couple with the all terrain attachment (see FIG. 6), resulting in a T-shaped adapter structure.

In one embodiment, the crossbar no has an adjustable width. For example, in one embodiment, as shown in FIG. 2, the crossbar 110 includes a fixed portion in and a telescoping portion 112 that slides in and out of the fixed portion to provide for lateral width adjustment between the side frames of the wheelchair. In another embodiment, the crossbar no has a fixed length. The crossbar no thus acts as a lateral support member for coupling with the all terrain attachment.

In the illustrated embodiment, the crossbar no includes symmetrical end clamps 115L, 115R affixed at each end of the crossbar. The end clamps 115L, 115R rigidly fix the crossbar no to the side frames 20L, 20R, respectively, of wheelchair 10. For example, the end clamps 115 may be configured to clamp onto either the bottom horizontal members 25 or the front vertical members 21 of the wheelchair 10, depending upon frame size and leg clearance.

Figure 3:
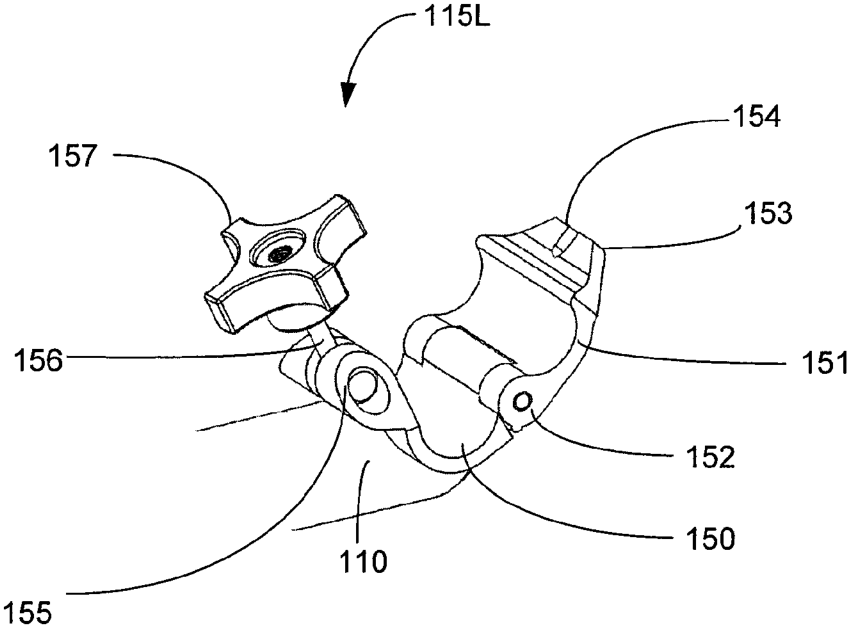
FIG. 3 is a perspective view of a clamp portion of the adapter of FIG. 2.

In one embodiment, as shown in more detail in FIG. 3, clamp 115L is formed as a pair of half-cylinders 150, 151 that are coupled together along a common longitudinal edge by a first hinge 152, such that the half-cylinders can be opened to release the clamp from the side frame, or closed to clamp onto the side frame. The first half-cylinder 150 is rigidly affixed to the end of crossbar no, for example, by a spot weld or other known attachment methods. Thus, the second half-cylinder 151 may be rotated about the hinge 152 to an open position (clockwise in this figure) or a closed position (counter-clockwise in this figure) relative to the first half-cylinder 150. The second half-cylinder 151 is formed to include a tab 153 affixed to and extending from the surface of the half-cylinder, and the tab includes a slot 154. The first half-cylinder 150 includes a second hinge 155 positioned roughly opposite from the first hinge 152 and having a threaded stud 156 extending from the middle of the second hinge and configured such that the stud can be rotated in the second hinge. A knob 157 having internal threads is threaded onto the stud 156, and is used to tighten the clamp 115 in the closed position, as discussed below. Clamp 115R has the same construction but a reverse orientation since it is affixed to the other end of the crossbar no.

Figure 4:
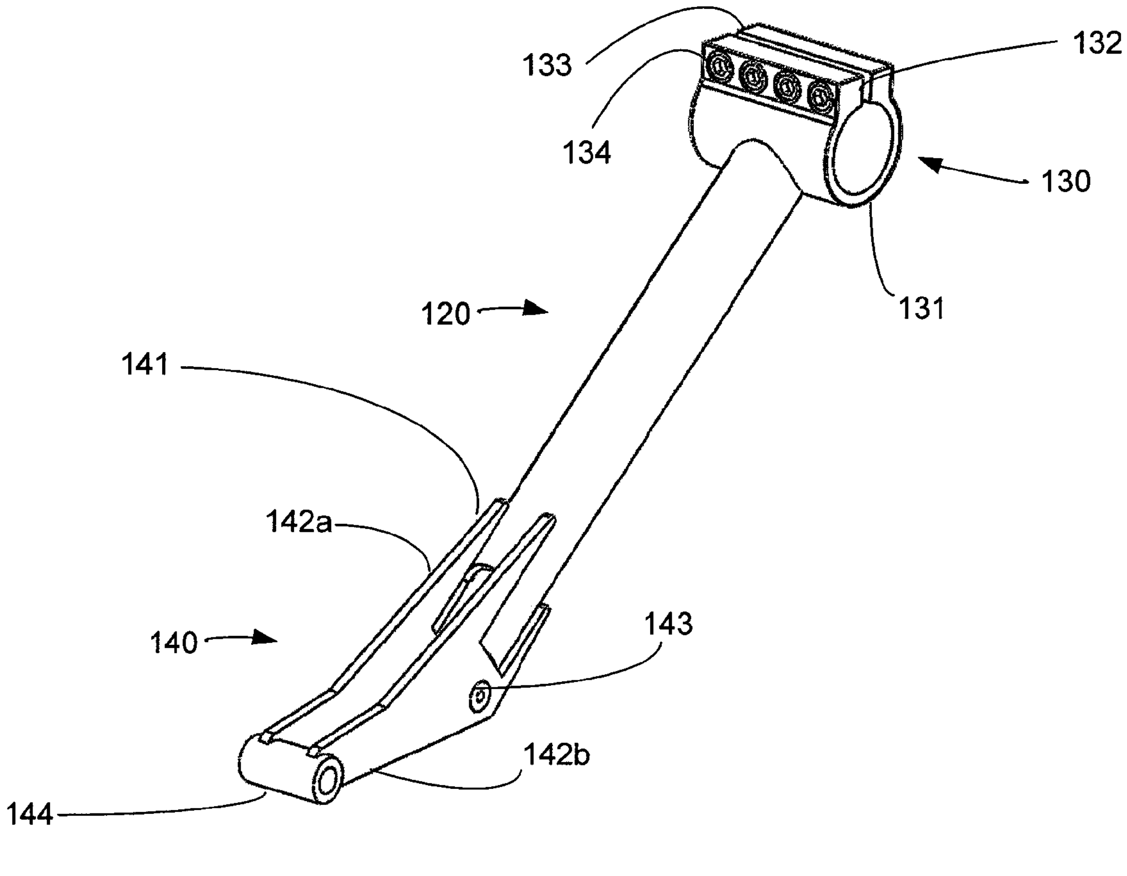
FIG. 4 is a perspective view of an extender bar portion of the adapter of FIG. 2.

Referring back to FIG. 2, a center clamp 130 is affixed to one end of the extender bar 120 and is used to couple the extender bar to the crossbar 110. A receptacle 140 is affixed to the other end of the extender bar 120 and is used to couple the extender bar to an all terrain attachment (not shown; see FIG. 6). The extender bar 120 extends down and forward at an angle of approximately 45 to 60 degrees relative to the horizontal plane and positions the receptacle 140 about 3 inches off the ground, but can be adjusted by securing the clamp 130 in an appropriate position on the crossbar 120. FIG. 4 illustrates one embodiment of the extender bar 120 including the center clamp 130 and the receptacle 140.

As shown in FIG. 4, the center clamp 130 is a cylindrical structure 131 having an open seam 132 along its length, with a series of nuts 133 affixed to the cylindrical structure on one side of the seam and at a right angle to the seam, and a series of bolts 134 affixed to the cylindrical structure on the other side of the seam in correspondence with the nuts. The cylindrical structure 131 slides over the crossbar 110 when the bolts 134 are loose. When properly positioned in the center of the space between the side frames of the wheelchair, the bolts 134 are tightened into the nuts 133 to secure the cylindrical structure 131 onto the middle of the crossbar no.

The center clamp 130 is rigidly coupled to one end of the extender bar 120. In one example, the end of the extender bar 120 is shaped to fit the clamp 130 and these components are welded together or affixed by other known attachment methods. The extender bar 120 is preferably coupled to the center clamp 130 at an angle to the horizontal of approximately 45 to 60 degrees. Fine angle adjustment can be made by rotating the center clamp 130 on the crossbar 110 before tightening. Any seam or roughness created on the inside surface of cylinder 131 must be removed in order for the clamp 130 to be effective.

Figure 6:
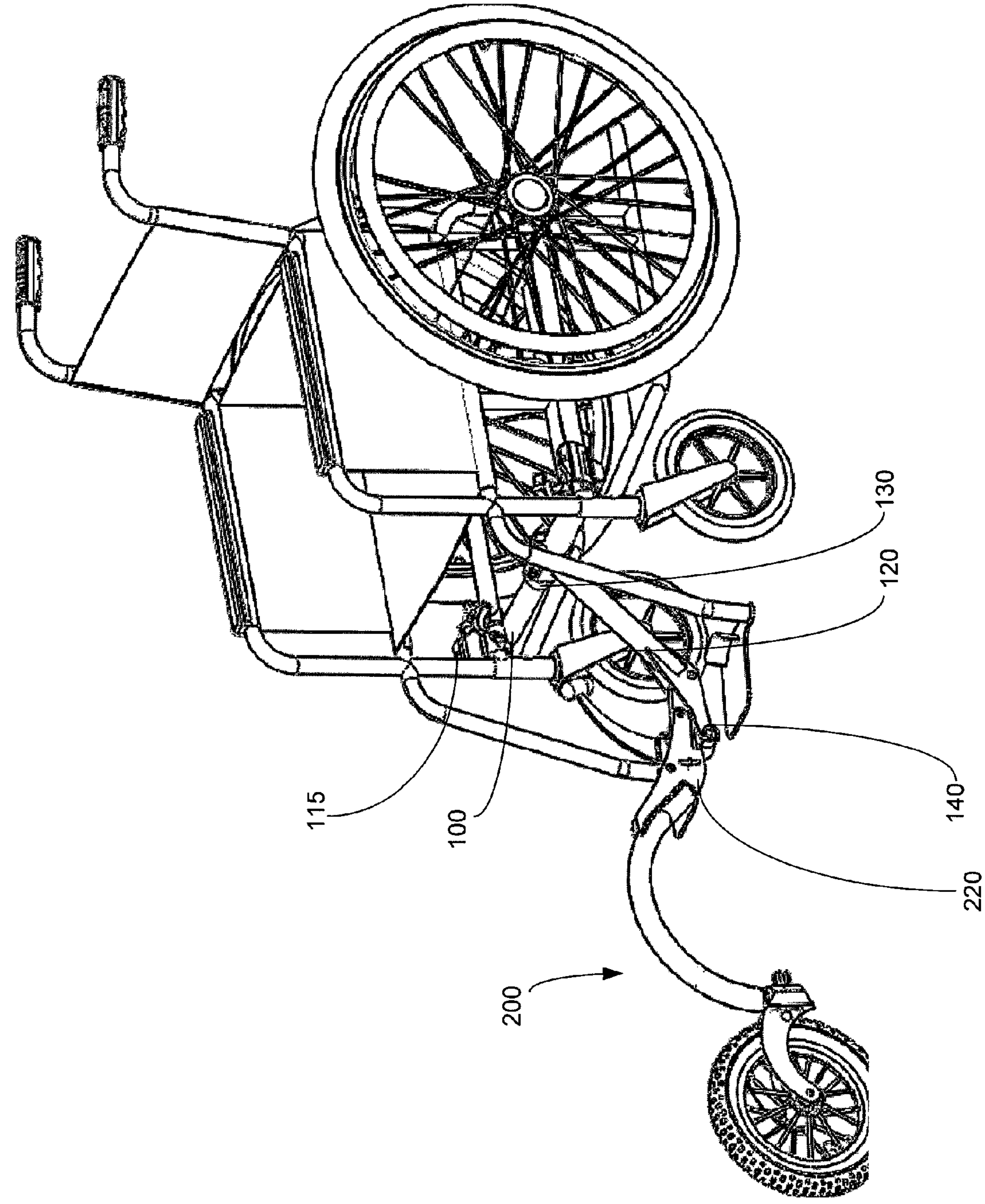
FIG. 6 is a perspective view illustrating an all terrain attachment installed onto the adapter which is installed on the folding wheelchair as in FIG. 5.

The receptacle 140 is rigidly coupled to the opposite end of the extender bar 120. For example, in one embodiment, the receptacle 140 includes four legs 141 on two parallel plates 142*a*, 142*b*, the legs extending from the receptacle up the extender bar 120 to position the receptacle where it is welded in place. A shaft 143 connects the plates 142*a*, 142*b* of the receptacle 140, for example, by being welded in place. Further, the receptacle 140 extends down and forward from the extender bar 120 at an angle of approximately 135 degrees. At the distal end of the receptacle 140, a cylindrical shaft 144 is coupled to the receptacle to provide a connection point for the all terrain attachment 200 as shown in FIG. 6.

3. Installing the Adapter and All Terrain Attachment

Figure 5:
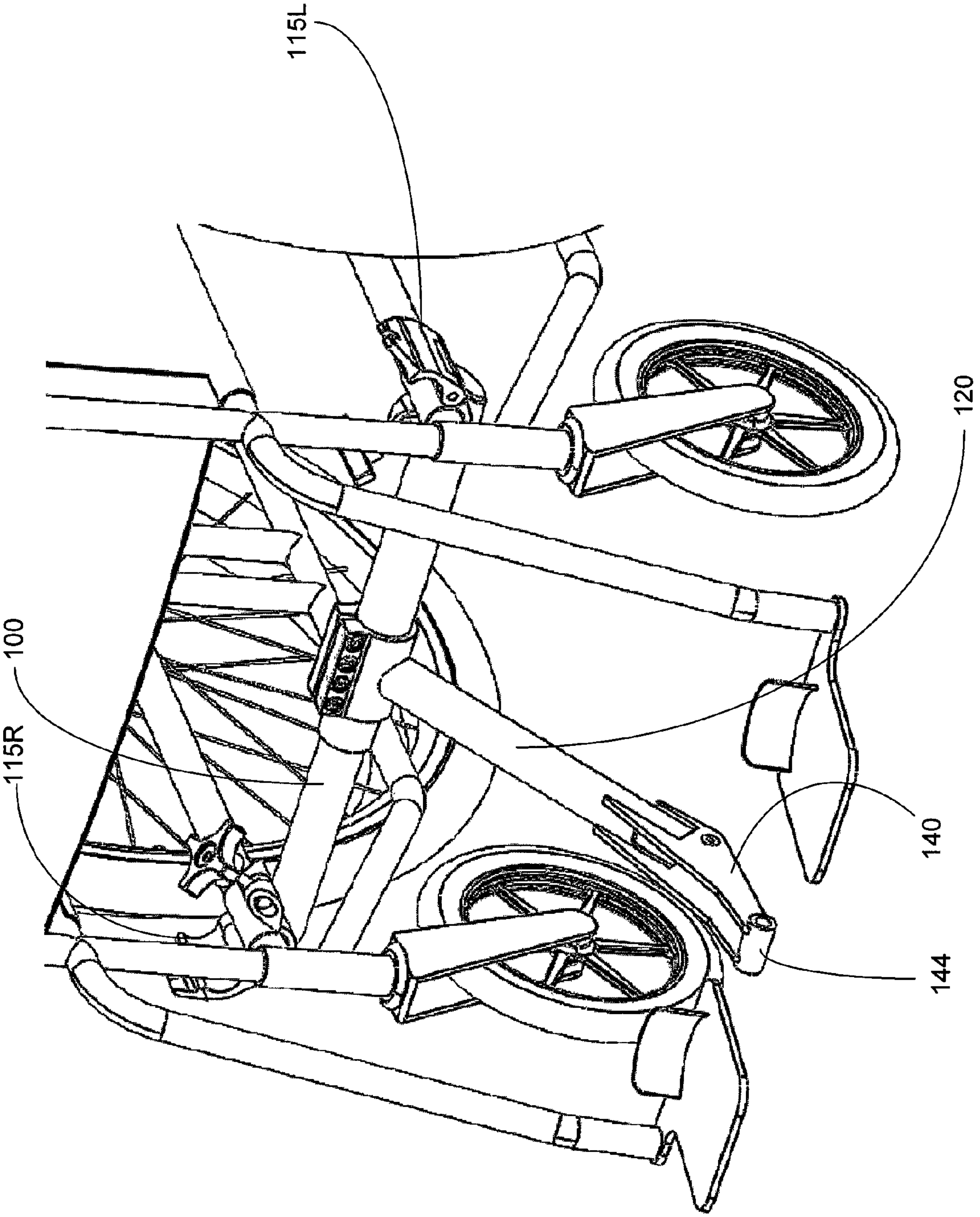
FIG. 5 is a perspective view illustrating the adapter of FIG. 2 installed onto the folding wheelchair of FIG. 1.

FIG. 5 illustrates the adapter 100 as installed onto the folding wheelchair 10 according to the following steps:

(1) The end clamps 115L, 115R of crossbar 110 are opened, and the bolts 134 on the center clamp 130 are loosened.

(2) The telescoping portion 112 of the crossbar no is moved in or out of the fixed portion in so that the crossbar fits into the width of the wheelchair between its side frames 20L, 20R, and more particularly, so that the end clamps 115 fit onto respective bottom horizontal members 25.

(3) The end clamps 115 are closed and tightened onto the members 25 of the side frames 20. This means that each clamp 115 is closed onto a tube 25 of the frame 20, the knob 157 is rotated into the slot 154 of tab 153, then tightened.

(4) The position of the center clamp 130 on the crossbar no is then adjusted so that the clamp is centered between the side frames 20 and positions the receptacle 140 about 3 inches off the ground.

Figure 7:
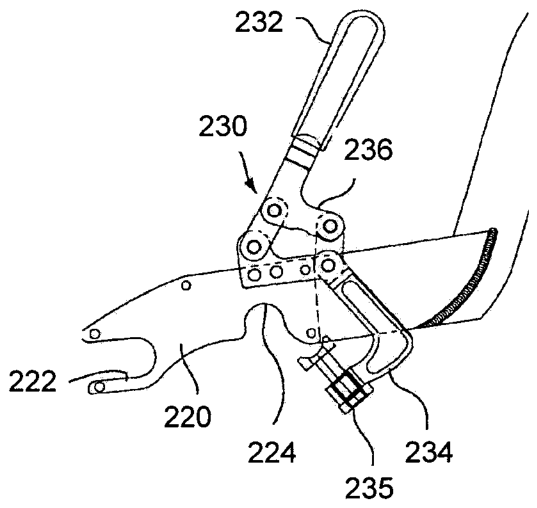
FIG. 7 is a plan view of a fixture for attaching the all terrain attachment to the adapter.

FIG. 6 illustrates the all terrain attachment 200 installed onto the adapter 100 according to the following steps:

(1) The FreeWheel all terrain attachment 200 is installed onto the shaft 144 of the receptacle 140 in the same manner described in U.S. Pat. No. 8,152,192, incorporated herein by reference. For example, FIG. 7 is an excerpt from FIG. 1 of U.S. Pat. No. 8,152,192, renumbered herein, which shows a detailed embodiment of an attachment fixture 220 that is part of the all terrain attachment 200 to the adapter 100. The attachment fixture 220 includes a fork opening 222 that engages the shaft 144 on the receptacle 140 and a notch 224 that rests on the shaft 143 on the receptacle. Some embodiments do not include the notch 224. A hand-operated clamp 230 includes a handle 232, a hook 234, and a linkage 236. When the handle 232 is pulled down to a closed position, the hook 234 engages shaft 144 to lock the fixture 220 onto the receptacle 140. When the handle 232 is released, the hook 234 disengages from the shaft 144 to unlock the fixture 220 from the receptacle 140 so that the all terrain attachment can be removed.

Figure 8:
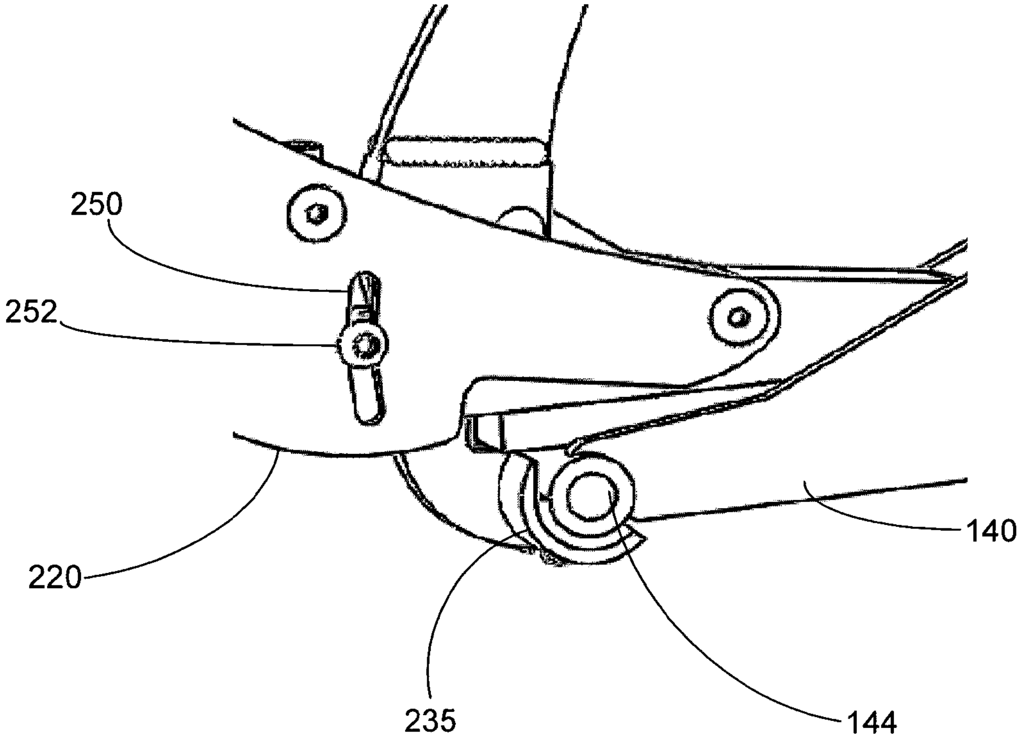
FIG. 8 is a plan view of a detail of the fixture shown in FIG. 7

(2) Adjust the forward angle of the extension bar as necessary such that all three wheels (large rear 14, small front 12, and all terrain attachment) contact the ground evenly. As shown in FIG. 8, the attachment fixture 220 may include a slot 250 having an angle adjustment screw 252 that when loosened, allows minor angle adjustment for the all terrain attachment 200. Likewise, the downward angle of the extender bar 120 may be fine-tuned by rotating the center clamp 130 on the crossbar no before tightening bolts 134. When the all terrain attachment 200 is installed at the proper angle, the bolts 134 are tightened on the center clamp, e.g., to approximately 20 foot-pounds, to secure the center clamp.

While one or more implementations have been described by way of example and in terms of specific embodiments, it is to be understood that one or more implementations are not limited to the disclosed embodiments. To the contrary, it is intended that the claims below cover various modifications and similar arrangements as would be apparent to those skilled in the art. Therefore, the scope of the appended claims should be accorded the broadest interpretation so as to encompass all such modifications and similar arrangements.

The invention claimed is:

1. An adapter for coupling an all terrain wheel attachment to a folding wheelchair, the folding wheelchair having a pair of side frames, comprising:

one and only one rigid crossbar having a first wheelchair connector at one end and a second wheelchair connector at the other end, each wheelchair connector configured for coupling the rigid crossbar to a respective side frame of the wheelchair; and one and only one rigid extension bar coupled at one end to a middle portion of the rigid crossbar and extending forward relative to the wheelchair, and at the other end, coupled to a shaft disposed in a horizontal plane, the shaft sized to receive a mating fork opening on an all terrain wheel attachment.

2. The adapter of claim 1, wherein the rigid crossbar has an adjustable length.

3. The adapter of claim 2, wherein the rigid crossbar includes a fixed portion and a telescoping portion that slides in and out of the fixed portion to provide the adjustable length.

4. The adapter of claim 1, wherein the first and second wheelchair connectors are end clamps.

5. The adapter of claim 4, wherein each end clamp comprises:

a first half-cylinder and a second half-cylinder, each half-cylinder having a length and a pair of edges along the length;

a first hinge connecting a first edge of the first half-cylinder and a first edge of the second half-cylinder such that the half-cylinders can be rotated relative to each other between an open position and a closed position;

a tab extending from a second edge of the second half-cylinder, the tab having a slot;

a second hinge connected to a second edge of the first half-cylinder, the second hinge having a threaded stud extending orthogonally from the second hinge and rotatable in the hinge, wherein the threaded stud is configured to mate with the slot when the first and second half-cylinders are in a closed position;

a knob threaded onto the threaded stud, wherein tightening the knob onto the threaded stud secures the first and second half-cylinders in the closed position, and wherein loosening the knob from the threaded stud allows the first and second half-cylinders to be rotated to the open position.

6. The adapter of claim 5, wherein each end clamp is a mirror image of the other end clamp, the first half-cylinder of each clamp being affixed to respective ends of the crossbar.

7. The adapter of claim 1, further comprising:

an extension connector configured to connect the one end of the rigid extension bar to the rigid crossbar.

8. The adapter of claim 7, wherein the extension connector is adjustable such that it can be loosened and moved to a new position on the rigid crossbar and then tightened at the new position.

9. The adapter of claim 7, wherein the extension connector is a center clamp.

10. The adapter of claim 9, the center clamp comprising:

a hollow cylinder having an open seam along a length of the cylinder; and at least one fastener affixed to the cylinder proximate to the seam and configured to tighten or loosen the cylinder on the crossbar.

11. The adapter of claim 1, wherein the rigid extension bar is coupled to the rigid crossbar at a fixed angle when the rigid crossbar is coupled to the side frames of the wheelchair.

12. The adapter of claim 1, further comprising:

an extension connector configured to connect the one end of the rigid extension bar to the rigid crossbar at a first angle when the rigid crossbar is coupled to the side frames of the wheelchair, wherein the extension connector is rotatable on the rigid crossbar to increase or decrease the first angle.

13. An adapter for coupling an all terrain wheel attachment to a folding wheelchair, the folding wheelchair having a pair of side frames, comprising:

one and only one rigid crossbar having two end clamps, one at each end thereof, each end clamp configured for coupling the crossbar to a respective side frame of the wheelchair; and one and only one rigid extension bar having a center clamp at one end coupled to the rigid crossbar, the rigid extension bar extending forward relative to the wheelchair and having a shaft at the other end disposed in a horizontal plane and configured for receiving a mating fork opening on an all terrain wheel attachment.

14. The adapter of claim 13, wherein the rigid crossbar has an adjustable length.

15. The adapter of claim 14, wherein the rigid crossbar includes a fixed portion and a telescoping portion that slides in and out of the fixed portion to provide the adjustable length.

16. The adapter of claim 13, wherein each end clamp comprises:

a first half-cylinder and a second half-cylinder, the first half-cylinder of each clamp affixed to a respective end of the rigid crossbar, each half-cylinder having a length and a pair of edges along the length;

a first hinge connecting a first edge of the first half-cylinder and a first edge of the second half-cylinder such that the second half-cylinders can be rotated relative to the first half-cylinder between an open position and a closed position;

a tab extending from a second edge of the second half-cylinder, the tab having a slot;

a second hinge connected to a second edge of the first half-cylinder, the second hinge having a threaded stud extending orthogonally from the second hinge and rotatable in the hinge, wherein the threaded stud is configured to mate with the slot when the first and second half-cylinders are in a closed position;

a knob threaded onto the threaded stud, wherein tightening the knob onto the threaded stud secures the first and second half-cylinders in the closed position, and wherein loosening the knob from the threaded stud allows the first and second half-cylinders to be rotated to the open position.

17. The adapter of claim 13, wherein the center clamp couples the rigid extension bar to the rigid crossbar at a fixed angle when the rigid crossbar is coupled to the side frames of the wheelchair.

18. The adapter of claim 13, wherein the center clamp is adjustable such that it can be loosened and either rotated about the rigid crossbar to a new position or moved to a new position on the rigid crossbar and then tightened at the new position.

19. The adapter of claim 18, the center clamp comprising:

a hollow cylinder having an open seam along a length of the cylinder; and at least one fastener affixed to the cylinder proximate to the seam and configured to tighten or loosen the cylinder on the rigid crossbar.

20. An adapter for coupling an all terrain wheel attachment to a folding wheelchair, the folding wheelchair having a pair of side frames, comprising:

one and only one rigid crossbar configured for coupling between the side frames of the wheelchair; and one and only one rigid extension bar coupled at one end to the rigid crossbar and coupled at the other end to a shaft disposed in a horizontal plane, the shaft sized to receive a mating fork opening on an all terrain wheel attachment.

* * * * *